(12) United States Patent
Isobe

(10) Patent No.: US 10,029,340 B2
(45) Date of Patent: Jul. 24, 2018

(54) MACHINE TOOL

(71) Applicant: FANUC Corporation, Yamanashi (JP)

(72) Inventor: Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 264 days.

(21) Appl. No.: 14/511,607

(22) Filed: Oct. 10, 2014

(65) Prior Publication Data
US 2015/0104263 A1 Apr. 16, 2015

(30) Foreign Application Priority Data

Oct. 11, 2013 (JP) .................................. 2013-213735

(51) Int. Cl.
B23Q 17/09 (2006.01)
G05B 19/00 (2006.01)
B23Q 15/00 (2006.01)

(52) U.S. Cl.
CPC ......... B23Q 17/09 (2013.01); B23Q 17/0961 (2013.01); G05B 19/00 (2013.01);
(Continued)

(58) Field of Classification Search
CPC ............... B23Q 15/00; B23Q 17/0961; B23Q 11/0089; Y10T 409/30084; Y10T 409/300896; Y10T 409/309352; Y10T 409/309408; Y10T 409/309464; Y10T 409/308008; Y10T 409/306832; Y10T 409/306888; Y10T 409/307224; Y10T 409/30728; Y10T 409/306776; Y10T 483/12; Y10T 483/123; Y10T 483/127;
(Continued)

(56) References Cited

U.S. PATENT DOCUMENTS 3,728,595 A * 4/1973 Adams ................... B23Q 17/00
318/39
3,829,750 A * 8/1974 Centner ............. G05B 19/4163
318/39
(Continued)

FOREIGN PATENT DOCUMENTS

CN 1550287 A 12/2004
CN 102686358 A 9/2012
(Continued)

OTHER PUBLICATIONS

JP 5-138502 English Translation.*
(Continued)

*Primary Examiner* — Daniel Howell
*Assistant Examiner* — Yasir Diab
(74) *Attorney, Agent, or Firm* — Hauptman Ham, LLP

(57) ABSTRACT

In a machine tool in which a spindle head is driven by a spindle head drive motor via a ball screw/nut mechanism, tools of different weights are each installed in the spindle head beforehand, a load torque applied to the spindle head drive motor is obtained, and relational data between the tool weight and the load torque is stored. When each tool is installed in the spindle head, the weight of the tool is estimated from, the load torque detected by a load torque detection unit while the spindle head is stopped, and the relational data between the tool weight and load torque.

14 Claims, 3 Drawing Sheets

(52) U.S. Cl.
CPC .............. *B23Q 15/00* (2013.01); *Y10T 408/21* (2015.01); *Y10T 408/36* (2015.01); *Y10T 408/57* (2015.01); *Y10T 483/12* (2015.01); *Y10T 483/132* (2015.01); *Y10T 483/134* (2015.01); *Y10T 483/138* (2015.01)

(58) Field of Classification Search
CPC .............. Y10T 483/13; Y10T 483/132; Y10T 483/134; Y10T 483/136; Y10T 483/138
USPC ... 409/79, 80, 134, 185, 186, 187, 193, 194, 409/231, 232, 233, 207; 483/4–11; 700/159, 170
See application file for complete search history.

(56) References Cited

U.S. PATENT DOCUMENTS

| | | | | |
|---|---|---|---|---|
| 5,274,562 | A | * | 12/1993 | Suzuki .................. B23Q 3/155 483/11 |
| 5,568,028 | A | * | 10/1996 | Uchiyama .......... G05B 19/4065 318/433 |
| 5,772,564 | A | | 6/1998 | Taniguchi et al. |
| 5,923,560 | A | * | 7/1999 | Ozaki .................. G05B 19/404 409/186 |
| 6,107,768 | A | * | 8/2000 | Ouchi ................ G05B 19/4068 318/568.1 |
| 6,202,002 | B1 | * | 3/2001 | Fainstein ........... G05B 19/4065 318/568.1 |
| 6,476,575 | B1 | * | 11/2002 | Fainstein ........... G05B 19/4163 318/568.22 |
| 2001/0027354 | A1 | * | 10/2001 | Kakino .............. G05B 19/4163 700/173 |
| 2002/0180394 | A1 | * | 12/2002 | Matsumoto ........ G05B 19/4062 318/623 |
| 2004/0167659 | A1 | * | 8/2004 | Scherer ............. G05B 19/4163 700/173 |
| 2004/0174130 | A1 | * | 9/2004 | Inoue .................... B23Q 17/09 318/569 |
| 2006/0169050 | A1 | | 8/2006 | Kobayashi et al. |
| 2009/0028656 | A1 | * | 1/2009 | Forker .................... B28D 1/18 409/80 |
| 2011/0137448 | A1 | * | 6/2011 | Scherer ............. G05B 19/4163 700/173 |

FOREIGN PATENT DOCUMENTS

| | | |
|---|---|---|
| CN | 102717288 A | 10/2012 |
| JP | 2-139149 A | 5/1990 |
| JP | 5-138502 A | 6/1993 |
| JP | H1029102 A | 2/1998 |
| JP | 11-188557 A | 7/1999 |
| JP | 2000-343379 A | 12/2000 |
| JP | 3119308 B2 | 12/2000 |
| JP | 2002-205236 A | 7/2002 |
| KR | 1020150037430 A | 4/2015 |

OTHER PUBLICATIONS

Office Action dated Jan. 13, 2015, corresponding to Japanese patent application No. 2013-213735.
Office Action in CN Application No. 2014.105312601, dated Aug. 8, 2016.
Office Action in DE Application No. 102014114420.1, dated Jan. 27, 2017.
Office Action in CN Application No. 201410531260.1 dated Jan. 17, 2017.

* cited by examiner

MACHINE TOOL

RELATED APPLICATIONS

The present application claims priority to Japanese Application Number 2013-213735, filed Oct. 11, 2013, the disclosure of which is hereby incorporated by reference herein in its entirety.

BACKGROUND OF THE INVENTION

1. Field of the Invention

The present invention relates to a machine tool, and more particularly to a machine tool that has a spindle head to/from which a tool can be attached/detached and processes a workpiece by moving the spindle head by a motor.

2. Description of the Related Art

There are some conventional machine tools available which are provided with a tool changer in order to correspond to the weight of a tool and function to change the operating speed of the spindle, because the inertia of the members that exchange, hold and move various tools varies depending on the weight of the tools and influence control of the operation of the machine tools. Owing to such mechanism, these machine tools can be operated at sufficient speed while minimizing the shock thereon or heat generated from the motor, by operating the machine tool at appropriate speed. In such conventional machine tools, usually the operator directly enters the data on the weight of the tool or transfers and inputs the prepared data into the control device of the machine tool.

However, allowing the operator to directly input the tool weight could cause erroneous input. Technology for causing a machine tool to detect the weight of a tool and the like without inputting the weight has been known.

Japanese Patent Application Publication No. H11-188557 discloses a tool changer with a changing arm in which a drive torque necessary for rotating the changing arm gripping a tool is detected based on changes in inertia that are caused by the weight of the tool gripped by the changing arm, and then the weight of the tool is estimated from the drive torque to automatically set the operating speed of the changing arm based on the estimated weight of the tool.

Japanese Patent Application Publication No. H5-138502, on the other hand, discloses a numerical control machining tool that is configured to previously determine the number of allowed rotations of the spindle with respect to a preset inertia moment of the tool, supply a constant power to the drive motor for the spindle after changing the tool, obtain a rise time from the start of the supply of the power to the moment when the rotation speed of the spindle rises to the set value, calculate an inertia moment of the spindle upon installation of the tool based on the obtained rise time, and compare the number of allowed rotations corresponding to the inertia moment with the rotation speed specified by the program, to determine the possibility of the specified rotation speed.

Japanese Patent Application Publication No. 2000-343379 discloses a main spindle head control device that is configured to estimate the weight of the tool on the spindle based on the value of current supplied to the magnetic bearing used in the spindle head, to determine the number of limit rotations of the spindle based on this estimated tool weight.

The rotation speed of the spindle capable of changing tools, the moving speed of the spindle head, and the like are limited in accordance with the weight of each gripped tool. For this reason, it is preferred to input the weight of the tool to be gripped by the spindle and control the weight based on optimal moving speed. It is also preferred to be able to automatically determine the weight of the tool for the purpose of preventing erroneous input of the tool weight.

The arm-type tool changer described in Japanese Patent Application Publication No. H11-188557 detects the drive torque necessary to rotate the changing arm gripping a tool, and then estimates the weight of the tool from this drive torque. However, this technology described in Japanese Patent Application Publication No. H11-188557 can only be applied to a machine tool with an arm-type tool changer.

On the other hand, Japanese Patent Application Publication No. H5-138502 estimates the inertia moment of a tool, thereby exerting the effect of preventing high-speed rotations beyond the capability of the spindle when attached with a heavy tool. However, only the inertia moment of the spindle can be estimated and therefore cannot be utilized in optimizing the tool changing operation or spindle head moving operation in accordance with the tool weight.

The main spindle head control device described in Japanese Patent Application Publication No. 2000-343379 estimates the weight of the tool installed in the spindle based on the value of current supplied to the magnetic bearing. Therefore, this device can only be applied to a machine tool that has a spindle head using a magnetic bearing, and not to a machine tool that does not use a magnetic bearing.

SUMMARY OF THE INVENTION

An object of the present invention is to provide a machine tool that uses a motor to move and process a spindle head to/from which a tool can be attached/detached, the machine tool being capable of estimating the weight of a tool installed in the spindle head without having tool weight data directly input.

A machine tool according to the present invention has a spindle head to/from which a tool can be attached/detached and a spindle head drive motor for driving the spindle head, the machine tool having: a load torque detection unit configured to detect a load torque applied to the spindle head drive motor; a data storage unit configured to obtain beforehand a relationship between a weight of a tool installed in the spindle head and a load torque that is applied to the spindle head drive motor under a predetermined drive condition, with respect to a plurality of objects of different weights, and store the relationship as relational data between weights of installed objects and load torques; and a tool weight estimation unit configured to detect a load torque of the spindle head drive motor under the predetermined driving condition when the tool is installed in the spindle head using the load torque detection unit, and estimate the weight of the tool installed in the spindle head based on the detected load torque and the relational data between weights of installed objects and load torques which are stored in the data storage unit. This configuration allows the machine tool alone to detect the weight of the tool installed in the spindle head.

A drive current may be used in place of the load torque. A drive current detection unit configured to detect a drive current value for the spindle head drive motor may be provided in place of the load torque detection unit. A drive current of the spindle head drive motor may be obtained in place of the load torque. Relational data between weights of installed objects and drive current values may be stored in the data storage unit, in place of the relational data between weights of installed objects and load torques. The tool weight estimation unit may estimate the weight of the tool installed in the spindle head in use of the relational data between weights of installed objects and drive current values and on bases of the drive current value detected by the drive current detection unit.

The machine tool according to the present invention has a spindle head to/from which a tool can be attached/detached and a spindle head drive motor for driving the spindle head, the machine tool having: a load torque detection unit configured to detect a load torque applied to the spindle head drive motor; and a tool weight estimation unit configured to, in use of a relational expression between a weight of a tool installed in the spindle head and a load torque applied to the spindle head drive motor under a predetermined driving condition and on the basis of the load torque detected by the load torque detection unit under the predetermined driving condition, calculate and estimate the weight of the tool installed in the spindle head. This configuration allows the machine tool alone to detect the weight of the tool installed in the spindle head.

A drive current may be used in place of the load torque. A drive current detection unit configured to detect a drive current value for the spindle head drive motor may be provided in place of the load torque detection unit. The tool weight estimation unit may use a relational expression between the weight of the tool and the drive current value in place of the relational expression between the weight of the tool and the load torque, to estimate the weight of the tool installed in the spindle head on the basis of this relational expression and the drive current value detected by the drive current detection unit.

The machine tool may have a spindle head configured to be driven in a vertical direction, and a ball screw/nut mechanism configured to drive the spindle head, and the tool weight estimation unit is configured to calculate and estimate a tool weight m by using a load torque of the spindle head drive motor while the spindle head is stopped, on the basis of the following relational expression:

$$m = 2\pi\eta T/gLZ - M$$

where T represents the load torque of the spindle head drive motor obtained while the spindle head is stopped, M represents the weight of the spindle head, Z represents a reduction rate of a deceleration mechanism provided between the spindle head drive motor and a ball screw, L represents a lead of the ball screw, η represents an efficiency of the ball screw, and g represents a gravitational acceleration.

The machine tool may have a tool magazine configured to hold a plurality of tools to be attached to and detached from the spindle head and manages the tools by tool numbers, and a tool storage unit configured to store the association between the weight of the tool estimated by the tool weight estimation unit and the tool numbers of the tools stored in the tool magazine. This configuration can create tool weight data corresponding to the tool numbers without having the tool weight data directly input.

Moreover, a tool of a known weight may be installed. The machine tool may include a correction unit configured to correct the relational expression between the weight of the tool and the load torque on the basis of, a load torque applied to the spindle head drive motor under the predetermined driving condition, detected by the load torque detection unit while a tool of a known weight is installed, and the weight of the tool. This configuration can correct the relational expression in a case where deterioration of a spindle head drive mechanism due to aging of the machine tool develops fluctuations in the relational expression.

Furthermore, a tool of a known weight may be installed. The machine tool may include a correction unit configured to correct the relational expression between the weight of the tool and the drive current value on the basis of, a drive current value of the spindle head drive motor under the predetermined driving condition, detected by the drive current detection unit while a tool of a known weight is installed, and the weight of the tool. This configuration can correct changes in the constants in the relational expression which are caused due to deterioration of the spindle head drive mechanism of the machine tool.

In addition, the machine tool may have a weight comparing unit for estimating the tool weight using the tool weight estimation unit while a tool of a known weight is installed, and compare the estimated tool weight with an actual tool weight to obtain a difference therebetween, and an alarm unit configured to display a message or generate a warning when the difference between the weights is equal to or greater than a predetermined value. Such a configuration of the machine tool can detect an abnormality of the spindle head drive system.

The machine tool may also have a weight comparing unit configured to compare a value of the weight of a tool estimated by the tool weight estimation unit when the tool is extracted from the tool magazine and then installed in the spindle head, with the tool weight stored in the tool weight data storage unit, to obtain a difference therebetween, and the machine tool is configured to display a message or generate a warning, when the difference between the weights is equal to or greater than a predetermined value.

The inventions according to claims 1 to 5 and the invention according to claim 10 are configured as described above to be able to estimate the tool weight from the load torque or drive current of the spindle head drive motor, eliminating the necessity to directly input the weights of tools and hence preventing erroneous input. Thus, the operation of the spindle head can appropriately be configured in accordance with the tool weights.

The invention according to claim 6 is configured as described above to be able to create the tool weight data corresponding to the tool numbers without having the tool weight data directly input. Thus, the operation of the tool changer can appropriately be configured in accordance with the placements and weights of the tools.

The inventions according to claims 7 and 10 are configured as described above to be able to correct the relational expression between the tool weight and the load torque or drive current of the spindle head drive motor and calculate a correct tool weight even when deterioration of the spindle head drive mechanism causes fluctuations in the relational expression. The invention according to claim 8 is configured as described above to be able to detect an abnormality of the drive system in accordance with the relational data between weights of objects installed in the spindle heads and load torques or the relational expression therebetween and the tool weight estimated by the tool weight estimation unit, and generate a warning. Owing to such a configuration, a problem with the drive system can be found prior to the occurrence of processing defects and other problems. The invention according to claim 9 is configured as described to be able to detect deterioration of a tool and confirm with a user whether the tool is changed or not. If the tool is not changed, this machine tool can inform the user of a risk of breakage of the tool or an abnormality of the drive system.

BRIEF DESCRIPTION OF THE DRAWINGS

The foregoing and other objects and features of the present invention will become more fully apparent from the following description of embodiments given with reference to the accompanying drawings.

DETAILED DESCRIPTION OF THE PREFERRED EMBODIMENTS

The machine tool with a simple configuration according to a few embodiments of the present invention estimates the weight of a tool attached to a spindle of the machine tool based on the load torque or drive current of a spindle head drive motor under a predetermined drive condition. Particularly, the tool weight is estimated without using any special or expensive parts. Furthermore, the estimated tool weight is associated with a tool number in the tool magazine and this association is stored, so that the operation of a tool changer or of the spindle head can be changed as appropriate in accordance with the tool weight.

<Embodiment 1>

Figure 1:
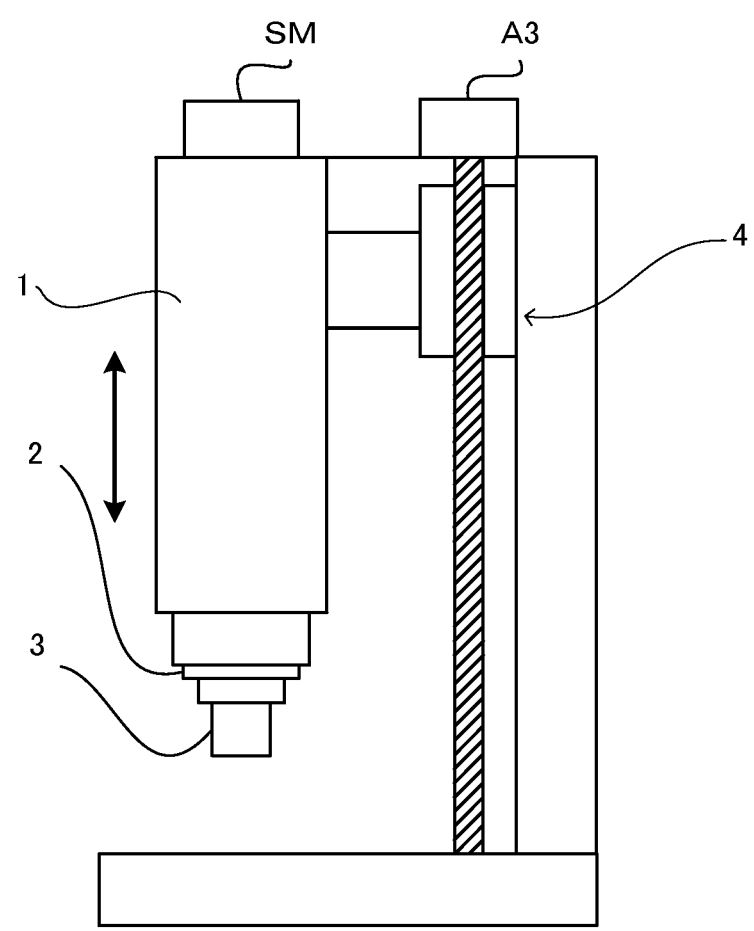
FIG. 1 is a schematic diagram of a spindle head and spindle head drive mechanism of a machine tool according to first and second embodiments of the present invention.

FIG. 1 is a schematic diagram of a spindle head and spindle head drive mechanism of a machine tool according to a first embodiment. In this embodiment, the spindle head 1 is moved in a vertical direction (Z-axis direction) by a spindle head drive motor (Z-axis feed shaft servomotor) A3. The spindle head 1 has a tool gripper 2 to/from which a tool 3 can be attached/detached. The spindle head 1 can be moved up and down by a ball screw/nut mechanism 4. The ball screw of the ball screw/nut mechanism 4 is coupled to the spindle head drive motor A3 directly or via a deceleration mechanism, wherein the spindle head 1 can be moved up and down as the spindle head drive motor A3 rotates. Reference numeral SM represents a spindle motor driven to rotate the spindle (and tool).

In this machine tool according to the first embodiment, the weight of the tool is estimated under a drive condition of the spindle head drive motor A3 in which the spindle head 1 is held in its stopped state. When the spindle head is stopped, the ball screw/nut mechanism 4 supports a gravity (M+m)g applied to the spindle and the ball screw/nut mechanism, where M represents the weight of the spindle head alone and m the weight of the tool. At this moment, a load torque T is applied to the spindle head drive motor A3 in order to prevent the ball screw/nut mechanism 4 from rotating. Therefore, when the tool weight m changes, the load torque T of the spindle head drive motor A3 also changes. The tool weight is estimated using this configuration.

Several types of tools of different weights are installed in the spindle head and the relational data between the tool weights $m_1$ to $m_n$ and the load torques $T_1$ to $T_n$ are recorded beforehand. In place of these tools, a plurality of dummies of different weights may be installed in the spindle head and the relational data thereof may be collected. This relational data are referred hereinafter as "relational data between weights of installed objects and load torques." When estimating the tool weight, the actual load torque T is detected first. Next, the relational data between weights of installed objects and load torques are browsed, from which the load torque $T_i$ that is proximate to the actual load torque T is selected, and then the (tool) weight $m_i$ corresponding to the load torque $T_i$ is set as a tool weight estimated value m. The tool weight may be obtained by interpolation from the load torques above and below the detected load torque T in the relational data between weights of installed objects and load torques.

The first embodiment illustrates an example in which the spindle head is drive in the vertical direction; however, the scope of the present invention is not limited thereto, and the direction of movement of the spindle head may be a different direction other than the horizontal direction. In a case where the direction of movement of the spindle head is a direction other than the horizontal direction, since the spindle head drive motor A3 is subjected to a load in order to keep the spindle head in its stopped state depending on the weight of the installed tool, the relational data between the weights $m_1$ to $m_n$ of the various tools (or dummies) installed in the spindle and the load torques $T_1$ to $T_n$ that are applied to the spindle head drive motor A3 at the moment (the relational data between weights of installed objects and load torques) are recorded, so that the tool weight can be estimated based on the stored data and the detected load torque T.

Figure 2:
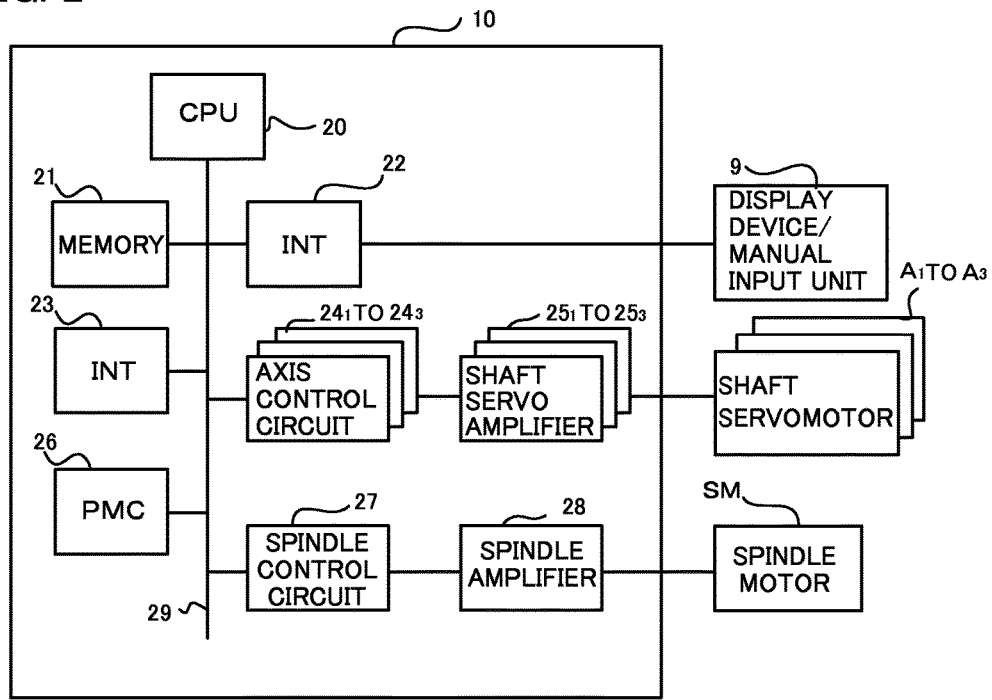
FIG. 2 is a block diagram of a controller controlling the drive of the machine tool according to the embodiments of the present invention.

FIG. 2 is a block diagram of a controller controlling the drive of the machine tool according to the first embodiment. Reference numeral 10 represents a numerical control device which is a control device for controlling the machine tool, wherein a CPU 20, a processor for controlling the entire numerical control device 10, is connected to a memory 21, interfaces 22, 23, various axis control circuits 24, programmable machine controller (PMC) 26, and a spindle control circuit 27 by a bus 29.

The CPU 20 reads a system program stored in a ROM of the memory 21 through the bus 29 and controls the entire numerical control device 10 in accordance with the system program. The memory 21 is configured by the ROM, a RAM, a nonvolatile memory and the like, wherein the ROM stores the system program and the like, while the RAM stores temporary computational data, display data, and various data that are input through a display device/manual input unit 9. The nonvolatile memory is configured by a SRAM which is backed up by a battery, and stores software for estimating the tool weight, which relates to this first embodiment. The relational data between the load torques $T_1$ to $T_n$ and the tool weights $m_1$ to $m_n$ (the relational data between weights of installed objects and load torques) that are measured beforehand as described above are also stored in the nonvolatile memory.

The interface 23 enables connection to an external device, and the PMC 26 is connected to an auxiliary device such as a tool changer of the machine tool by a sequence program embedded in the numerical control device 10.

In addition, the interface 22 is connected to the display device/manual input unit 9 that is configured by a liquid crystal or CRT display device and a manual input unit such as a keyboard. The axis control circuits $24_1$ to $24_3$ for controlling the feed shafts on the X-axis, Y-axis and Z-axis each receive a movement command amount for each feed shaft from the CPU 20, output a feed shaft command to each of servo amplifier $25_1$ to $25_3$, to drive each feed shaft servomotor $A_1$ to $A_3$. In this first embodiment, the Z-axis feed shaft servomotor A3 configures the spindle head drive motor.

The axis control circuits $24_1$ to $24_3$ have position loop, speed loop, and current loop controllers for feedback-controlling the positions, speeds and currents in response to position, speed, and current feedback signals from position/speed/detectors and current detectors embedded in the servomotors $A_1$ to $A_3$, respectively, to control the position, speed and current (drive torque).

The spindle control circuit 27 outputs a spindle speed signal to a spindle amplifier 28 in response to a spindle rotation speed command from the CPU 20. The spindle amplifier rotates the spindle motor SM at the instructed rotation speed (number of revolutions) in response to the spindle speed signal, and feedback-controls the speed so that the speed coincides with the spindle rotation speed command, in response to a return pulse that is fed back from a position coder, not shown, in synchronization with the rotation.

The configuration of the numerical control device is same as the numerical control device controlling a conventional machine tool, except for the fact that the memory 21 stores the software that functions to estimate the tool weight and the relational data between the weights of the installed objects ($m_1$ to $m_n$) and the load torques ($T_1$ to $T_n$) that are measured in advance.

Figure 3:
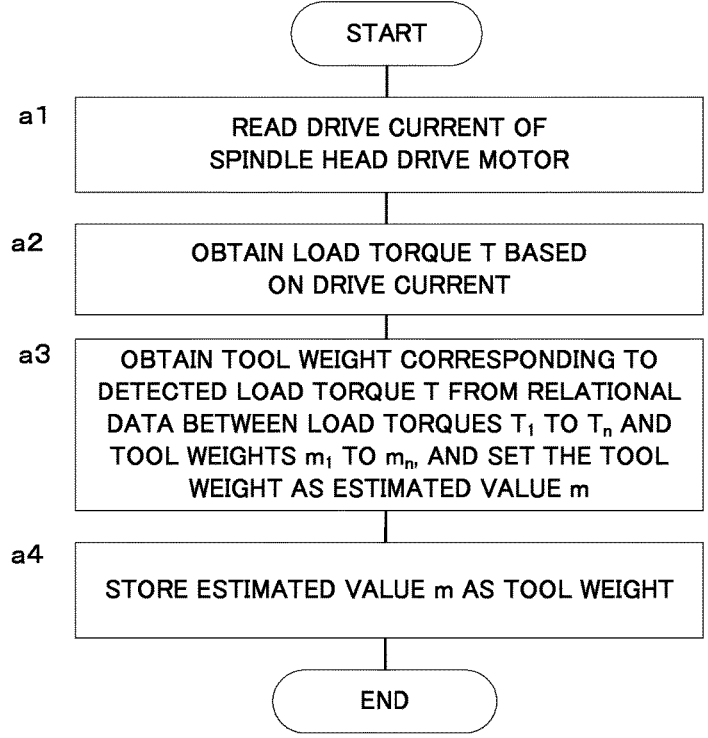
FIG. 3 is a flowchart showing an algorithm of a tool weight estimation process according to the first embodiment.

FIG. 3 is a flowchart showing an algorithm of a tool weight estimation process, which is the software functioning to estimate the tool weight according to the first embodiment.

When the tool 3 is installed on the tool gripper 2 and a tool weight estimation command is input from the display device/manual input unit 9 while the spindle is stopped, the CPU 20 starts the process shown in FIG. 3. A drive current of the spindle head drive motor (Z-axis motor) A3 that is detected by the current detector and fed back to the axis control circuit $24_3$ of the drive current of the spindle head drive motor (Z-axis motor) A3 is read (step a1). The load torque T is obtained based on this read drive current (step a2). In the first embodiment, a load torque detection unit is configured by the process of steps a1 and a2 in which the drive current of the spindle head drive motor (Z-axis motor) A3 is read and the load torque T is obtained based on this drive current.

Next, from the previously stored relational data between the load torques of $T_1$ to $T_n$ and tool weights $m_1$ to $m_n$ and weights of installed objects, the load torque $T_i$ that is proximate to the obtained load torque T is selected, and then the tool weight $m_i$ corresponding to the load torque $T_i$ is obtained as the tool weight estimated value m (step a3). In the first embodiment, a tool weight estimation unit is configured by this process of step a3. Next, this obtained estimated value m is stored as the tool weight in the memory 21 (step a4), then the tool weight estimation process ends.

Note that the first embodiment describes an example in which the spindle head moves in the vertical direction (Z-axis direction) as shown in FIG. 1; however, the present invention can be applied to a machine tool in which the direction of movement of the spindle head has an inclined axis (the direction of movement of the spindle head is in a direction other than the horizontal direction), wherein the relational data between weights of installed objects and load torques may be obtained beforehand, while the spindle head is stopped in the machine tool having this inclined axis, and the data may be stored in the memory 21. Then the tool weight estimated value m may be obtained based on the stored relational data in step a3.

<Embodiment 2>

In the first embodiment the relational data between the tool weights $m_1$ to $m_n$ and the load torques $T_1$ to $T_n$ are stored in the memory 21, and then the weight m of the tool installed in the spindle is estimated from the relational data between weights of installed objects and load torques. However, the tool weight can be estimated from a relational expression between the load torque T and the tool weight m. In the machine tool shown in FIG. 1 in which the spindle is driven in the vertical direction, the following relational expression is established between the load torque T of the spindle head drive motor A3 and the tool weight m under the condition that the spindle head is stopped.

$$T=(M+m)gLZ/2\pi\eta \qquad (1)$$

M: Weight of the spindle head
Z: Reduction rate of deceleration mechanism provided between spindle head drive motor and ball screw
L: Lead of ball screw
η: Efficiency of ball screw
g: Gravitational acceleration The following expression (2) is obtained by modifying the expression (1);

$$m=(2\pi\eta T/gLZ)-M \qquad (2)$$

wherein M, L and Z are constant, and the efficiency η of the ball screw changes as a result of long-term use of the machine tool, but it becomes a fixed value, $(2\pi\eta/gLZ)=K$.

$$m=K\cdot T-M \qquad (3)$$

Therefore, after installing the tool in the spindle, the load torque T is detected when the spindle head is stopped, to calculate the tool weight m.

In case of the second embodiment, step a3 of the tool weight estimation process shown in FIG. 3 may be replaced with the arithmetic processing (2) or (3) described above.

Note that the example described in the second embodiment illustrates a case in which the spindle is drive in the vertical direction, but the scope of the present invention is not limited thereto. Even in a case where the direction in which the spindle is driven is inclined with respect to the vertical direction, use of the components of the gravity acting on the spindle head and tool in the spindle head drive axis direction, enables calculation of the tool weight.

<Embodiment 3>

In the first and second embodiments, the components of the gravity acting on the spindle head and tool in the spindle head drive axis direction can be used to detect the load torque of the spindle head drive motor when the spindle head is stopped, thereby obtaining the tool weight. However, when the spindle head drive axis direction is the horizontal direction, the gravity acting on the spindle head and tool does not have to be supported by the ball screw when the spindle head is stopped; thus, the tool weight estimating method cannot be used when the spindle head is stopped. In the third embodiment, the tool weight can be estimated when the spindle head drive direction is the horizontal direction. The third embodiment, therefore, estimates the tool weight when the spindle head is driven.

Figure 4:
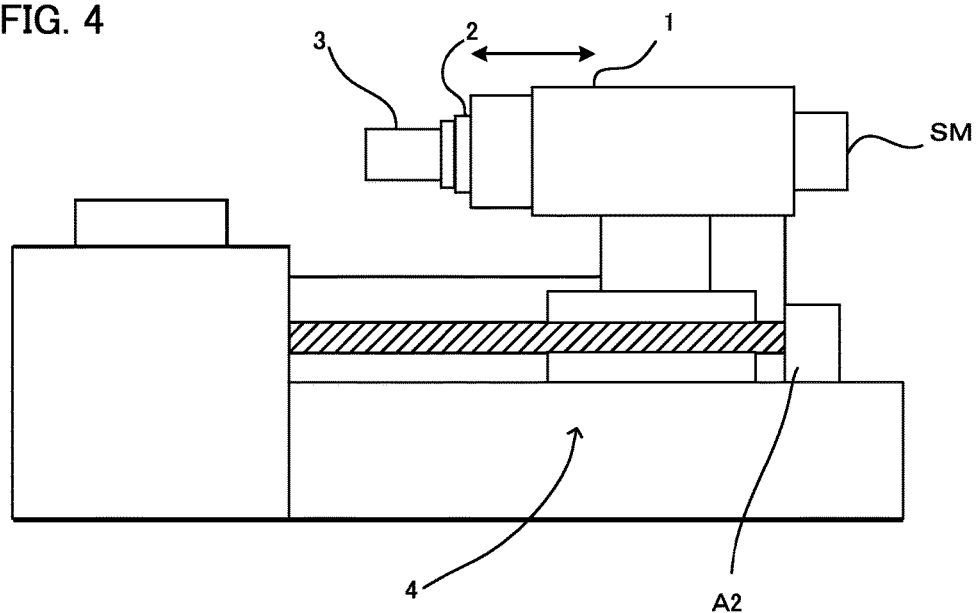
FIG. 4 is a schematic diagram of a spindle head and spindle head drive mechanism of a machine tool according to third and fourth embodiments of the present invention.

FIG. 4 is a schematic diagram of the spindle head and spindle head drive mechanism of the machine tool according to the third embodiment. In this example, the spindle head 1 is moved in the horizontal direction by the spindle head drive motor (Y-axis feed shaft servomotor) A2. The spindle head 1 has the tool gripper 2 to/from which the tool 3 can be attached/detached. The spindle head 1 can be moved from side to side (the Y-axis direction, the horizontal direction) by the ball screw/nut mechanism 4. The ball screw of the ball screw/nut mechanism 4 is coupled to the spindle head drive motor A2, wherein the spindle head 1 can be moved as the spindle head drive motor A2 rotates. Reference numeral SM represents a spindle motor.

As with the control device described in the first and second embodiments, the control device of the machine tool according to the third embodiment is as shown in the schematic diagram of FIG. 2. The difference with the first and second embodiments is that the spindle head drive motor is configured by the feed shaft drive servomotor in the direction of the X-axis or Y-axis which is the horizontal direction, because the spindle head moves in the horizontal direction. In the example shown in FIG. 4, the Y-axis feed shaft servomotor A2 configures the spindle head drive motor.

In the machine tool shown in FIG. 4, the weight of the spindle head itself is assumed as M, the tool weight as m, the angular speed of the spindle head drive motor as ω, and the angular acceleration of the same as α. At this moment, the load torque T applied to the spindle head drive motor A2 is defined by M, m, ω, and α, as long as the other operating conditions are the same. In a case where the M, m, ω, and α are constant (except for when ω=α=0), a change in the tool weight m alone causes a change in the load torque T of the spindle head drive motor.

Based on this fact, when several types of tools of different weights $m_1$ to $m_n$ are each installed in the spindle under a condition that the spindle head drive motor A2 is driven at a certain angular speed ω by an angular acceleration α, the third embodiment obtains, beforehand, the load torques $T_1$ to $T_n$ applied to the spindle head drive motor A2 and records the relational data between the weights $m_1$ to $m_n$ and the load torques $T_1$ to $T_n$ in the memory 21. In this embodiment as well, the load torques $T_i$ to T, applied to the spindle head drive motor A2 may be obtained when several types of dummy tools having weights different from the weights $m_1$ to $m_n$ are installed in the spindle. These relational data are referred to as "relational data between weights of installed objects and load torques" hereinafter, as with the first embodiment.

Figure 5:
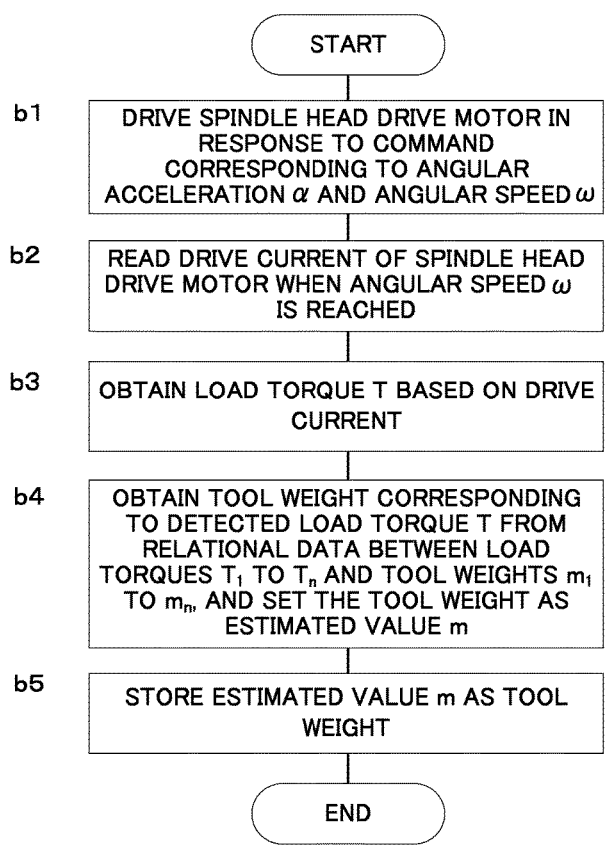
FIG. 5 is a flowchart showing an algorithm of a tool weight estimation process according to the third embodiment.

Once the tool weight estimation command is input from the display device/manual input unit 9, the CPU 20 starts the process shown in FIG. 5.

First, the CPU 20 outputs a command corresponding to the angular acceleration α and the angular speed ω to the axis control circuit $24_2$ of the spindle head drive motor (Y-axis feed shaft servomotor) A2. The axis control circuit $24_2$ executes speed loop control to obtain the angular speed ω at the angular acceleration α and drives the spindle head drive motor (Y-axis feed shaft servomotor) A2 through the servo amplifier $25_2$ (step b1). Next, when the angular speed of the spindle head drive motor A2 that is fed back from the speed detector reaches ω, the drive current of the spindle head drive motor A2 fed back from the current detector is read (step b2). The load torque T is obtained from the read drive current (step b3). In the third embodiment, the load torque detection unit is configured by steps b2 and b3. Then, the load torque $T_i$ proximate to the obtained load torque T is selected from the relational data between the weights $m_1$ to $m_n$ and the load torques $T_1$ to $T_n$ and the weight $m_i$ corresponding to the load torque $T_i$ is obtained as the tool weight estimated value m (step b4). As with the first embodiment, the tool weight may be obtained by interpolation from the load torques above and below the load torque T detected from the relational data between weights of installed objects and load torques. In the third embodiment, the tool weight estimation unit is configured by the process of step b4. Next, the obtained estimated value m is stored as the tool weight in the memory 21 (step b5), then the tool weight estimation process ends.

The third embodiment illustrates an example in which the spindle head is drive in the horizontal direction; however, the scope of the present invention is not limited thereto. Even in a case where the direction in which the spindle head is driven is the vertical direction as shown in FIG. 2 or is inclined with respect to the horizontal direction, the tool weight estimating method of the third embodiment for estimating the tool weight when the spindle head is driven can be applied.

<Embodiment 4>

As with the second embodiment, the tool weight can be estimated from the relational expressions between the tool weight m and the load torque T without using the relational data between the (tool) weights $m_1$ to $m_n$ and the load torques $T_1$ to $T_n$. In the machine tool shown in FIG. 4 in which the spindle head is driven in the horizontal direction, the following relational expression is established between the load torque T and the tool weight m of the spindle head drive motor A2 when the spindle head is driven.

$$T=((M+m)gL/2\pi\eta+T_P)Z+(J_1+Z^2(J_2+(M+m)(L/2\pi)^2))\alpha \quad (4)$$

M: Weight of the spindle head
Z: Reduction rate of deceleration mechanism provided between spindle head drive motor and ball screw
L: Lead of ball screw
η: Efficiency of ball screw
$T_P$: Frictional torque
$J_1$: Inertia moment of motor
$J_2$: Inertia moment of ball screw
α: Angular acceleration of motor shaft.

The following expression is obtained by modifying this expression (4).

$$m=(T-T_PZ-J_1\alpha-Z^2J_2\alpha)/(gLZ/2\pi\eta+Z^2(L/2\pi)^2\alpha)-M \quad (5)$$

Based on this relational expression, the actual load torque T applied when the spindle head is driven can be detected and the tool weight m can be calculated. Moreover, since the values of Z, L, $T_P$, $J_1$, $J_2$ and α are constant when there are no changes in the efficiency η of the ball screw, expression (5) becomes the following expression (6), with the fixed values of $(gLZ/2\pi\eta+Z^2(L/2\pi)^2\alpha)=K1$ and $(T_PZ+J_1\alpha+Z^2J_2\alpha)=K2$.

$$m=[(T-K2)/K1]-M \quad (6)$$

Based on this expression (5) or (6), the tool weight m can be calculated and estimated from the detected load torque T. In this case, step b4 of the tool weight estimation process shown in FIG. 5 is replaced with the process for estimating and calculating the tool weight from the expression (5) or (6).

The fourth embodiment illustrates an example in which the spindle head is driven in the horizontal direction; however, the scope of the present invention is not limited thereto. Even in a case where the direction in which the spindle head is driven is inclined with respect to the horizontal direction, the tool weight can be estimated by adding the term expressing gravity applied to the spindle head to the relational expression.

In the foregoing first and fourth embodiments, the load torque T is detected and the tool weight m is estimated based on the load torque T, wherein the load torque T is obtained by multiplying a torque constant by a drive current I, and the load torque and the drive current I are in a proportional relationship with each other. Therefore, instead of storing the relational data between the (tool) weights $m_1$ to $m_n$ and the load torques $T_1$ to $T_n$, the relational data between the (tool) weights $m_1$ to $m_n$ and drive currents $I_1$ to $I_n$ may be stored beforehand, and then the current I may be read to estimate the tool weight m based on the relational data between the (tool) weights $m_1$ to $m_n$ and the drive currents $I_1$ to $I_n$. In this case, without executing steps a2 and b3 of the processes shown in FIGS. 3 and 5, steps a3 and b4 may be executed to obtain the estimated value m of the tool weight based on the drive current I read in step a1 or b2 and the relational data between the tool weights $m_1$ to $m_n$ and drive currents $I_1$ to $I_n$.

The tool weight can be estimated by multiplying the torque constant by the detected drive current I in place of the load torque T, by using the expressions (2) and (3) or expressions (5) and (6). Additionally, the axis control circuits $24_1$ to $24_3$ that control the servomotors of the respective axes having the spindle head drive motors may each output a torque command from the speed loop controller to the current loop circuit, and these torque commands may be detected as the load torques.

There is provided a tool weight storage unit for storing data on the association between the foregoing estimated weights of the tools installed in the spindle head and the tool numbers in the tool magazine for storing the tools. With this storage unit, the information on a certain tool of a certain weight stored in a certain position of the tool magazine can be stored in the control device. For example, in step a4 of the tool weight estimation process shown in FIG. 3 or step b5 of the same shown in FIG. 5, the estimated value m of the tool weight is associated with the corresponding tool number in the tool magazine, and this association is stored. As a result, the operation of the tool changer can be configured appropriately by using the data on the positions and weights of the tools in the tool magazine. Moreover, the tool weight data corresponding to the tool numbers can be created without having such data directly input, achieving the effect of appropriately configuring the operation of the tool changer in accordance with the positions and weights of the tools.

When calculating and estimating the tool weight m from the relational expression ((2), (3), (5), (6)) between the load torque T (or drive current I) and tool weight as in the second and fourth embodiments, the constants used in the relational expression might change. As a result of long-term use of the machine tool, the spindle head drive mechanism deteriorates, changing the efficiency and frictional torque. Consequently, some of the constants of the relational expression between the load torque of the motor and the tool weight change as well, and the correct tool weight can no longer be calculated. Therefore, a tool of a known weight is installed in the spindle head, the load torque of the spindle head drive motor is detected using the same method as those described in the second and fourth embodiments, and the constants of the relational expression between the tool weight m and the detected load torque T are corrected in such a manner that the relations expressed by the expressions (1) to (3) or (4) to (6) are established.

For instance, changes in the efficiency η of the ball screw are considered using the relational expressions (2) and (3) between the motor load torque and the tool weight when the spindle head of the machine tool shown in FIG. 1 is stopped. The following expression (2) or (3) has to be established between the known tool weight m and the detected load torque T.

$$m=(2\pi\eta T/gLZ)-M \quad (2)$$

$$m=K \cdot T-M \quad (3)$$

The relational expression (2) or (3) is established by changing η in the expression (2) or K in the expression (3). The constants in the relational expression (2) or (3) can be corrected in this manner, enabling the spindle head drive mechanism to tolerate the aging of the machine tool.

When obtaining the load torque to drive the spindle head and calculating and estimating the tool weight using the expression (5) or (6) as in the fourth embodiment, a tool of a known weight m may be installed in the spindle head, the load torque T for driving the spindle head by angular acceleration α at angular speed ω may be detected, and the constants in the expression (5) or (6) may be changed and corrected so that the expression (5) or (6) is established between the tool weight m and the detected load torque T.

This tool weight estimating method, can also detect an abnormality and the like in the spindle head drive mechanism and tools.

Using the method described above, the tool weight is estimated for a tool of a known weight, and a warning is generated when the difference between the estimated value and the actual tool weight is equal to or greater than a predetermined value. An abnormality of the spindle head drive mechanism can be found in this manner. In this case, step a4 of the process shown in FIG. 3 or step b5 of the process shown in FIG. 5 may be replaced with a process for determining whether the difference between the estimated tool weight m and the actual known weight of the tool is equal to or greater than the fixed value, and displaying a warning on the display device/manual input unit 9 (e.g., an alarm unit) when the difference is equal to or greater than the predetermined value.

In a case where the load applied to the motor is large relative to the actual weight of the tool due to, for example, a foreign matter adhered to the ball screw, the tool weight is estimated as being larger than the actual weight. Detecting such an abnormality and generating a warning enables early discover of problems before a serious problem occurs in the machine tool.

Furthermore, the estimated tool weight may be compared with a tool weight stored in the tool weight storage unit in which the tool weight data associated with the tool numbers in the tool magazine are stored, and when the difference therebetween is equal to or greater than the predetermined value, a message or an alarm may be generated to confirm with a user whether the tool is changed or not. When the tool is not changed, there is a risk of breakage of the tool or an abnormality of the drive system. This function enables early discover of such problems. In this case, step a4 shown in FIG. 3 or step b5 shown in FIG. 5 may be replaced with a process for obtaining the difference between the estimated tool weight and the tool weight stored in the tool weight storage unit that corresponds to a tool to be used, determining whether the difference is equal to or greater than the fixed value, and displaying a message or generating an alarm encouraging a change of the tool when the difference is equal to or greater than the fixed value. By executing the process of FIG. 3 or 5 with the new step a4 or b5 every time when changing a tool, abnormalities thereof and the spindle head drive mechanism can be detected.

Each of the foregoing embodiments illustrates the machine tool that has the spindle head drive mechanism driven by the ball screw/nut mechanism and rotary motor; however, the present invention is not limited to this scope.

For example, even in a machine tool that uses a linear motor to drive a spindle head, estimation of the tool weight from the load applied to the spindle head drive motor, correction of the relational expression between the motor load the tool weight based on the estimated tool weight, and detection of an abnormality in the drive system or tool, can be realized.

What is claimed is:

1. A machine tool, comprising:
a spindle head to/from which a tool is attachable/detachable;
a spindle motor configured to rotate the spindle head;
a spindle head drive motor configured to move the spindle head in a vertical direction;
a ball screw/nut mechanism coupled between the spindle head and the spindle head drive motor, wherein the spindle head drive motor is configured to move the spindle head in the vertical direction via the ball screw/nut mechanism;
a load torque detection unit configured to detect a load torque applied to the spindle head drive motor;
a data storage unit configured to
obtain beforehand a relationship between a weight of a tool installed in the spindle head and a load torque that is applied to the spindle head drive motor under a predetermined drive condition, with respect to a plurality of objects of different weights, and
store the relationship as relational data between weights of installed objects and load torques; and
a processor configured to
detect a load torque of the spindle head drive motor under the predetermined driving condition when the tool is installed in the spindle head using the load torque detection unit, and
estimate the weight of the tool installed in the spindle head based on the detected load torque and the relational data between weights of installed objects and load torques which are stored in the data storage unit,
wherein an operation of the spindle head is changed in accordance with the estimated weight of the tool.

2. A machine tool, comprising:
a spindle head to/from which a tool is attachable/detachable;
a spindle motor configured to rotate the spindle head;
a spindle head drive motor configured to move the spindle head in a vertical direction;
a ball screw/nut mechanism coupled between the spindle head and the spindle head drive motor, wherein the spindle head drive motor is configured to move the spindle head in the vertical direction via the ball screw/nut mechanism;
a load torque detection unit configured to detect a load torque applied to the spindle head drive motor; and
a processor configured to, in use of a relational expression between a weight of a tool installed in the spindle head and a load torque applied to the spindle head drive motor under a predetermined driving condition and on the basis of the load torque detected by the load torque detection unit under the predetermined driving condition,
calculate and estimate the weight of the tool installed in the spindle head,
wherein an operation of the spindle head is changed in accordance with the estimated weight of the tool.

3. The machine tool according to claim 1, wherein
the load torque detection unit comprises a drive current detection unit configured to detect a drive current value for the spindle head drive motor,
relational data between weights of installed objects and drive current values are configured to be stored beforehand in the data storage unit, as the relational data between weights of installed objects and load torques, and
the processor is further configured to
estimate the weight of the tool installed in the spindle head, in use of the relational data between weights of installed objects, and
drive current values and on bases of the drive current value detected by the drive current detection unit.

4. The machine tool according to claim 2, wherein
the load torque detection unit comprises a drive current detection unit configured to detect a drive current value for the spindle head drive motor, and
the processor is further configured to
use a relational expression between the weight of the tool and the drive current value, and
estimate the weight of the tool installed in the spindle head on the basis of this relational expression and the drive current value detected by the drive current detection unit.

5. The machine tool according to claim 2, wherein
the processor is further configured to calculate and estimate a tool weight m by using a load torque of the spindle head drive motor while the spindle head is stopped, on the basis of the following relational expression:

$$m = 2\pi \eta T/gLZ - M$$

where
T represents the load torque of the spindle head drive motor obtained while the spindle head is stopped,
M represents the weight of the spindle head,
Z represents a reduction rate of a deceleration mechanism provided between the spindle head drive motor and the ball screw,
L represents a lead of the ball screw,
η represents an efficiency of the ball screw, and
g represents a gravitational acceleration.

6. The machine tool according to claim 1, wherein:
a plurality of tools are held to be attached to and detached from the spindle head and the tools are managed by tool numbers, and
the machine tool further comprises a tool weight data storage unit configured to store an association between the tool weight estimated by the processor and each of the tool numbers of the plurality of tools.

7. The machine tool according to claim 2, further comprising:
a correction unit configured to correct the relational expression between the weight of the tool and the load torque on the basis of, a load torque applied to the spindle head drive motor under the predetermined driving condition, detected by the load torque detection unit while a tool of a known weight is installed, and the weight of the tool.

8. The machine tool according to claim 4, further comprising:
a correction unit configured to correct the relational expression between the weight of the tool and the drive current value on the basis of, a drive current value of the spindle head drive motor under the predetermined driving condition, detected by the drive current detection unit while a tool of a known weight is installed, and the weight of the tool.

9. The machine tool according to claim 1, wherein
the processor is further configured to
estimate the tool weight while a tool of a known weight is installed, and
compare the estimated tool weight with an actual tool weight to obtain a difference therebetween, and
the machine tool further comprises
an alarm unit configured to display a message or generate a warning when the difference between the weights is equal to or greater than a predetermined value.

10. The machine tool according to claim 6, wherein
the processor is further configured to compare a value of the weight of a tool estimated by the processor when the tool is installed in the spindle head, with the tool weight stored in the tool weight data storage unit, to obtain a difference therebetween, and
the machine tool is configured to display a message or generate a warning when the difference between the weights is equal to or greater than a predetermined value.

11. A machine tool, comprising:
a spindle head to/from which a tool is attachable/detachable;
a spindle head drive motor for driving the spindle head;
a load torque detection unit configured to detect a load torque applied to the spindle head drive motor;
a data storage unit configured to
obtain beforehand a relationship between a weight of a tool installed in the spindle head and a load torque that is applied to the spindle head drive motor under a predetermined drive condition, with respect to a plurality of objects of different weights, and
store the relationship as relational data between weights of installed objects and load torques; and
a processor configured to
detect a load torque of the spindle head drive motor under the predetermined driving condition when the tool is installed in the spindle head using the load torque detection unit, and
estimate the weight of the tool installed in the spindle head based on the detected load torque and the relational data between weights of installed objects and load torques which are stored in the data storage unit,
wherein
an operation of the spindle head is changed in accordance with the estimated weight of the tool,
the spindle head is configured to be driven in a vertical direction,
the machine tool further comprises a ball screw/nut mechanism configured to drive the spindle head, and
the processor is further configured to calculate and estimate a tool weight m and the load torque T from the relational expressions below, established between the load torque T and the tool weight m of the spindle head drive motor when the spindle head is driven, $$T=((M+m)gL/2\pi\eta+T_p)Z+(J_1+Z^2(J_2+(M+m)(L/2\pi)^2))\alpha$$

where
M represents the weight of the spindle head,
Z represents a reduction rate of a deceleration mechanism provided between the spindle head drive motor and the ball screw,
L represents a lead of the ball screw,
η represents an efficiency of the ball screw,
$T_P$ represents a frictional torque,
$J_1$ represents an inertia moment of the spindle head drive motor,
$J_2$ represents an inertia moment of the ball screw, and
α represents an angular acceleration of a motor shaft of the spindle head drive motor.

12. The machine tool according to claim 5, wherein the factor □□ in the relational expression varies in accordance with the aging of the machine tool.

13. The machine tool according to claim 11, wherein the factor □□ in the relational expression varies in accordance with the aging of the machine tool.

14. The machine tool according to claim 11, wherein the relational expressions is modified as $$m=(T-T_PZ-J_1\alpha-Z^2J_2\alpha)/(gLZ/2\pi\eta+Z^2(L/2\pi)^2\alpha)-M.$$

* * * * *